Patented Aug. 14, 1945

2,382,845

UNITED STATES PATENT OFFICE 2,382,845

PREPARATION OF SULPHUR NITRIDE

Michael Henry Miller Arnold and William Eric Perry, Norton-on-Tees, England, assignors to Imperial Chemical Industries Limited, a corporation of Great Britain No Drawing. Application July 1, 1941, Serial No. 400,688. In Great Britain July 30, 1940

5 Claims. (Cl. 23—204)

This invention relates to the production of solid mixtures containing sulphur nitride, which are substantially free from ammonium chloride.

In the preparation of mixtures containing sulphur nitride by reacting ammonia with one or more chlorides of sulphur there is obtained a solid containing sulphur nitride, sulphur and ammonium chloride, from which it has been proposed to remove the ammonium chloride by leaching with water. When the reaction is carried out in the presence of an organic solvent for the sulphur chloride, the sulphur nitride, sulphur and ammonium chloride are obtained as a precipitate after the liquor has become saturated with these compounds, the precipitate being separated from the organic solvent before being leached with water for the removal of ammonium chloride.

This method of removing ammonium chloride suffers from the disadvantages that the final drying operation, after leaching out ammonium chloride with water, requires particular care in order to avoid hydrolysis of the sulphur nitride by the excessive amount of water retained by the residue, and that the dried sulphur nitride-containing mixture is liable still to contain undesirable amounts of ammonium chloride.

The present invention provides a process whereby these disadvantages are substantially avoided.

According to the present invention, there is provided a process for the production of solid mixtures containing sulphur nitride and substantially free from ammonium chloride, which comprises reacting ammonia with one or more chlorides of sulphur, treating the solid reaction product with water in the presence of an organic liquid immiscible with and heavier than water, separating the aqueous liquor from the organic liquid and removing from the latter the solid sulphur nitride and solid sulphur contained therein.

When the reaction between ammonia and one or more chlorides of sulphur is carried out in the presence of an organic solvent for the chloride or chlorides of sulphur, it is preferable to employ a solvent which is immiscible with and heavier than water, so that it can also serve as the organic liquid in the subsequent separation of the ammonium chloride from the remainder of the reaction product.

A further feature of the invention as applied to the production of sulphur nitride-containing mixtures substantially free from ammonium chloride by reacting ammonia with one or more chlorides of sulphur dissolved in an organic liquid of the type hereinbefore defined, consists in allowing a period of time to elapse as hereinafter defined, during which ammonia is preferably passed through the stirred reaction mixture after the reaction is complete, but before treating the reaction mixture with water as hereinbefore described. This feature has the advantage that on treating the reaction mixture with water the solid containing sulphur nitride and sulphur settles to the bottom of the organic liquid, is free from water and may be dried without risk of hydrolysis.

The period of time which should be allowed to elapse before treating the reaction mixture with water as hereinbefore defined depends on the scale on which the preparation of mixtures containing sulphur nitride and substantially free from ammonium chloride is being undertaken, but such time may easily be determined by adding water to a small sample of the reaction mixture and observing the rate at which the solid settles in the organic liquid: when rapid settling of the solid occurs in a sample so treated, the whole of the reaction mixture may then be treated with water as hereinbefore defined.

The crude solid product of the reaction between ammonia and one or more chlorides of sulphur may be treated with the whole of the water at once, or with successive portions, each of which is removed, before adding the next portion. The aqueous liquor may be separated from the organic liquid by any suitable means, for example by treatment in a centrifuge, or by allowing them to separate into two layers and withdrawing the aqueous layer.

Liquid halogenated hydrocarbons such as chloroform and carbon tetrachloride are suitable organic liquids for use in the process of this invention. We prefer to use carbon tetrachloride because of its non-inflammability, lower solvent power for sulphur nitride, and cheapness.

It may be desirable to provide for the presence of powdered fillers, for example talc, bentonite, chalk, and anhydrite in the finished product, and we have found it advantageous, especially when sulphur dichloride is used as a starting material, to add such fillers to the organic liquid containing the solid sulphur nitride and the solid sulphur after removing the aqueous layer. By this means there are avoided both the difficulties associated with the mixing of dry finely divided solids, and the danger of explosions which are liable to occur when handling dry mixtures containing a large percentage of sulphur nitride.

Example 842 grams of sulphur mono-chloride were mixed with 6 litres of carbon tetrachloride, which had been used for a series of previous preparations carried out as hereinafter described, and was consequently saturated with sulphur nitride, sulphur and iminosulphur ($S_7NH$). Dry ammonia gas was passed into the mixture at a rate of about 50 litres/hour with vigorous stirring until the mixture was salmon red in colour and smelt of ammonia, carbon tetrachloride being added from time to time to replace that lost by evaporation. The reaction was then complete and the reaction mixture comprised a solid containing sulphur nitride, sulphur, iminosulphur and ammonium chloride in suspension in carbon tetrachloride but the ammonia was still passed into the mixture with vigorous stirring for a further 6 hours. To the reaction mixture was then added an equal volume of water, the whole stirred vigorously for about ¼ hour, allowed to separate into two layers, and the top aqueous layer decanted. The carbon tetrachloride layer, containing all the sulphur nitride, sulphur and iminosulphur in solution and as a sediment was then filtered. The residue on the filter was dried at 80° C. to give a solid product weighing 430 grams and containing 32.5% of sulphur nitride and 7% of iminosulphur, the remainder being sulphur.

We claim:

1. In a process for the production of mixtures containing sulphur nitride substantially free from ammonium chloride, the steps which comprise dissolving at least one chloride of sulphur in an inert organic liquid immiscible with and heavier than water which prior to solution has been substantially saturated with sulphur nitride and other products of the chloride of sulphur-ammonia reaction, introducing ammonia into the solution and effecting the reaction therein between the ammonia and the chloride of sulphur, treating the reaction product with water, separating the aqueous layer from the organic layer, and removing the sulphur nitride and sulphur from the organic layer.

2. In a process for the production of a mixture containing sulphur nitride substantially free from ammonium chloride, the steps which comprise dissolving at least one chloride of sulphur in carbon tetrachloride which prior to solution has been substantially saturated with the products of the chloride of sulphur-ammonia reaction, effecting a reaction in said solution between the chloride of sulphur and ammonia, treating the reaction product with water, separating the aqueous layer containing substantially all of the ammonium chloride from the carbon tetrachloride layer, and removing the sulphur nitride and sulphur from the carbon tetrachloride layer.

3. In a process for the production of mixtures containing sulphur nitride substantially free from ammonium chloride, the steps which comprise dissolving at least one chloride of sulphur in an inert organic liquid immiscible with and heavier than water which prior to solution has been substantially saturated with sulphur nitride and the other products of the chloride of sulphur-ammonia reaction, introducing ammonia into the solution and effecting the reaction therein between the ammonia and the chloride of sulphur, treating the reaction product with water, separating the aqueous layer from the organic liquid, adding mineral filler to the organic liquid, and removing the sulphur nitride, sulphur and mineral filler from the organic liquid.

4. In a process for the production of a mixture of sulphur nitride substantially free from ammonium chloride, the steps which comprise dissolving 842 parts by weight of sulphur monochloride in 950 parts by weight of carbon tetrachloride which prior to use has been substantially saturated with sulphur nitride, sulphur, and imino-sulphur, passing dry ammonia gas into the mixture until it becomes salmon-red in color and smells of ammonia, continuing the introduction of ammonia for about six hours thereafter, adding an equal volume of water while stirring vigorously, allowing the mixture to separate into two layers, decanting the top aqueous layer, and filtering the sulphur nitride, sulphur and imino-sulphur from the carbon tetrachloride layer.

5. In a process for the production of a mixture containing sulphur nitride substantially free from ammonium chloride, the steps of reacting ammonia with at least one chloride of sulphur dissolved in carbon tetrachloride which prior to solution has been saturated with sulphur nitride, continuing the reaction while introducing ammonia after formation of the sulphur nitride to give substantially immediate settling of a precipitate upon treating the reaction mixture with water, allowing the mixture to separate into layers, separating the aqueous layer from the carbon tetrachloride layer and removing from the carbon tetrachloride layer the contained sulphur nitride and sulphur.

MICHAEL H. M. ARNOLD.
WILLIAM ERIC PERRY.